(12) United States Patent
Lin

(10) Patent No.: US 6,336,616 B1
(45) Date of Patent: Jan. 8, 2002

(54) MOVABLE PROJECTION SCREEN HANGER WITH STEADFAST CLIPS

(75) Inventor: Hsin-Fu Lin, Tainan (TW)

(73) Assignee: Peace Ship International Enterprises Co., Ltd., Tainan (TW)

( * ) Notice: Subject to any disclaimer, the term of this patent is extended or adjusted under 35 U.S.C. 154(b) by 0 days.

(21) Appl. No.: 09/624,971

(22) Filed: Jul. 25, 2000

(30) Foreign Application Priority Data

Nov. 18, 1999 (TW) ....................................... 88219860 U

(51) Int. Cl.$^7$ ............................................... F21V 35/00
(52) U.S. Cl. .............................. 248/222.11; 248/225.11; 248/225.21; 248/231.41; 248/266; 248/306
(58) Field of Search ........................... 248/231.41, 271, 248/286.1, 266, 267, 222.14, 222.11, 225.11, 225.21, 306; 359/450, 461, 443; 160/23.1, 17

(56) References Cited

U.S. PATENT DOCUMENTS

| 1,039,903 A | * | 10/1912 | Crane |
| 3,829,050 A | * | 8/1974 | Brautaset et al. |
| 4,311,295 A | * | 1/1982 | Jamar, Jr. |
| 4,718,625 A | * | 1/1988 | Boda |
| 5,287,575 A | * | 2/1994 | Allen et al. |
| 5,296,964 A | * | 3/1994 | Shopp |
| 5,582,377 A | * | 12/1996 | Quesada |
| 5,647,421 A | * | 7/1997 | Hoffmann et al. |
| 6,111,694 A | * | 8/2000 | Shopp |

* cited by examiner

Primary Examiner—Ramon O. Ramirez
Assistant Examiner—Korie H. Chan
(74) Attorney, Agent, or Firm—Rosenberg, Klein & Lee

(57) ABSTRACT

A movable projection screen hanger with steadfast clips is provided where the upper surface and inward side surface of the hanger are each respectively provided with a sliding rail. Each steadfast clip is secured to a preferred position on a wall. Each steadfast clip is composed by a main body and a pulling button. On the bottom end and near the central position of the inner side surface of the main body a hook block and a reinforcing block are respectively provided to respectively engage the sliding rail on the inward side surface of the hanger and to act as a stop against side surface of the hanger. A pair of catching flanges are formed on the bottom of the pulling button to engage the sliding rail on the upper surface of the hanger, so that each steadfast clip on a wall firmly secures the hanger.

1 Claim, 7 Drawing Sheets

MOVABLE PROJECTION SCREEN HANGER WITH STEADFAST CLIPS

BACKGROUND OF THE INVENTION

1. Field of the Invention

The present invention relates to a movable projection screen hanger with steadfast clips, the steadfast clips being convenient for a user to select suitable fixing positions before being secured to a wall. More particularly, the present invention is directed to a movable hanger which can be adjusted to a preferable position after being assembled with the steadfast clips on a wall.

2. Description of the Related Art

Various activities to pass on knowledge and information are frequently held in modern times. Projectors are widely used as auxiliary teaching tools in most teaching activities. Accordingly, a projection screen is indispensable for showing the projected content from a projector. A projection screen scroll is placed in a hanger, and the hanger must be secured to a wall before the projection screen scroll is pulled down for use.

Referring to FIGS. 1 and 2, a conventional projection screen hanger includes a suspending body 10 and two fixing covers 20. While being used, both ends of the suspending body 10 containing a projection screen scroll are successively inserted in two fixing covers 20 and secured by screws to be firmly assembled herewith. Each fixing surface 21 of each fixing cover 20 is screwed to a wall by a screw to secure the assembled hanger to a wall. Then, the scroll of the projection screen is pulled down for use.

However, there are the following drawbacks in the structure of the above-mentioned conventional projection screen hanger:

1. Because two fixing covers are respectively fixed at both ends of the suspending body once they are assembled together, screwing the fixing covers 20 to a wall causes trouble and wastes time if there happens to be hidden posts or hollow sections at the positions of the wall where both fixing covers are intended to be secured.
2. For the fixing covers to be secured to a wall, the screws of the fixing covers securing the suspending body must be removed first and then the fixing covers are taken off the suspending body. The suspending body must be separated from the fixing covers and taken off the wall if the projection screen scroll in the suspending body needs to be replaced.
3. At least two people are needed to firmly support the assembled hanger at a certain height to screw the fixing covers to a wall.

SUMMARY OF THE INVENTION

Therefore, the present invention is designed to provide a movable projection screen hanger with steadfast clips that substantially obviates the drawbacks of the related conventional art.

An object of the present invention is to provide a movable projection screen hanger which can be easily taken off or secured through operation of a pulling button of each steadfast clip.

Another object of the present invention is to provide a movable projection screen hanger with steadfast clips where the steadfast clips are convenient for a user to select proper positions on a wall to avoid the hidden posts or hollow sections in the wall before being secured.

Yet another object of the present invention is to provide a movable projection screen hanger which can be adjusted to a preferable position after being assembled to the steadfast clips mounted on a wall.

To achieve these advantages, the present invention provides a movable projection screen hanger with steadfast clips. On the upper surface and inward side surface of the hanger are each respectively provided with a sliding rail. Each steadfast clip is screwed to a preferred position on a wall before being operated. Each steadfast clip is composed by a main body and a pulling button. A hook block is provided on the bottom end of the main body and a reinforcing block is provided near the central position of the inner side surface of the main body for engagement with the sliding rail on the inward side surface of the hanger and to stop against the side surface of the hanger. On the bottom end of the pulling button there is provided a pair of catching flanges to catch the sliding rail on the upper surface of the hanger, for each steadfast clip on a wall to firmly secure the hanger.

DETAILED DESCRIPTION OF THE PREFERRED EMBODIMENTS

Figure 1:
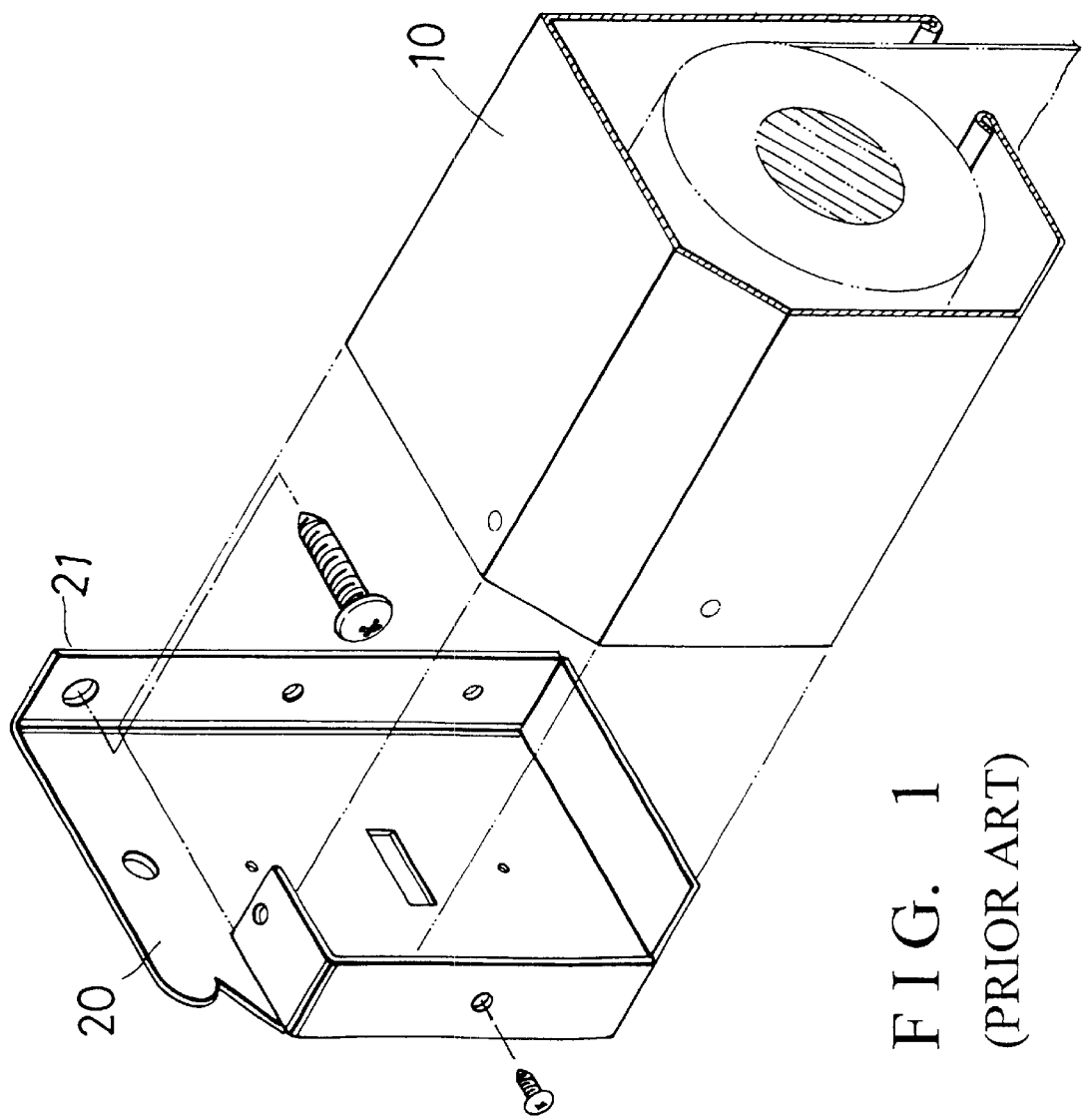
FIG. 1 is a perspective exploded view of a conventional projection screen hanger.
Figure 2:
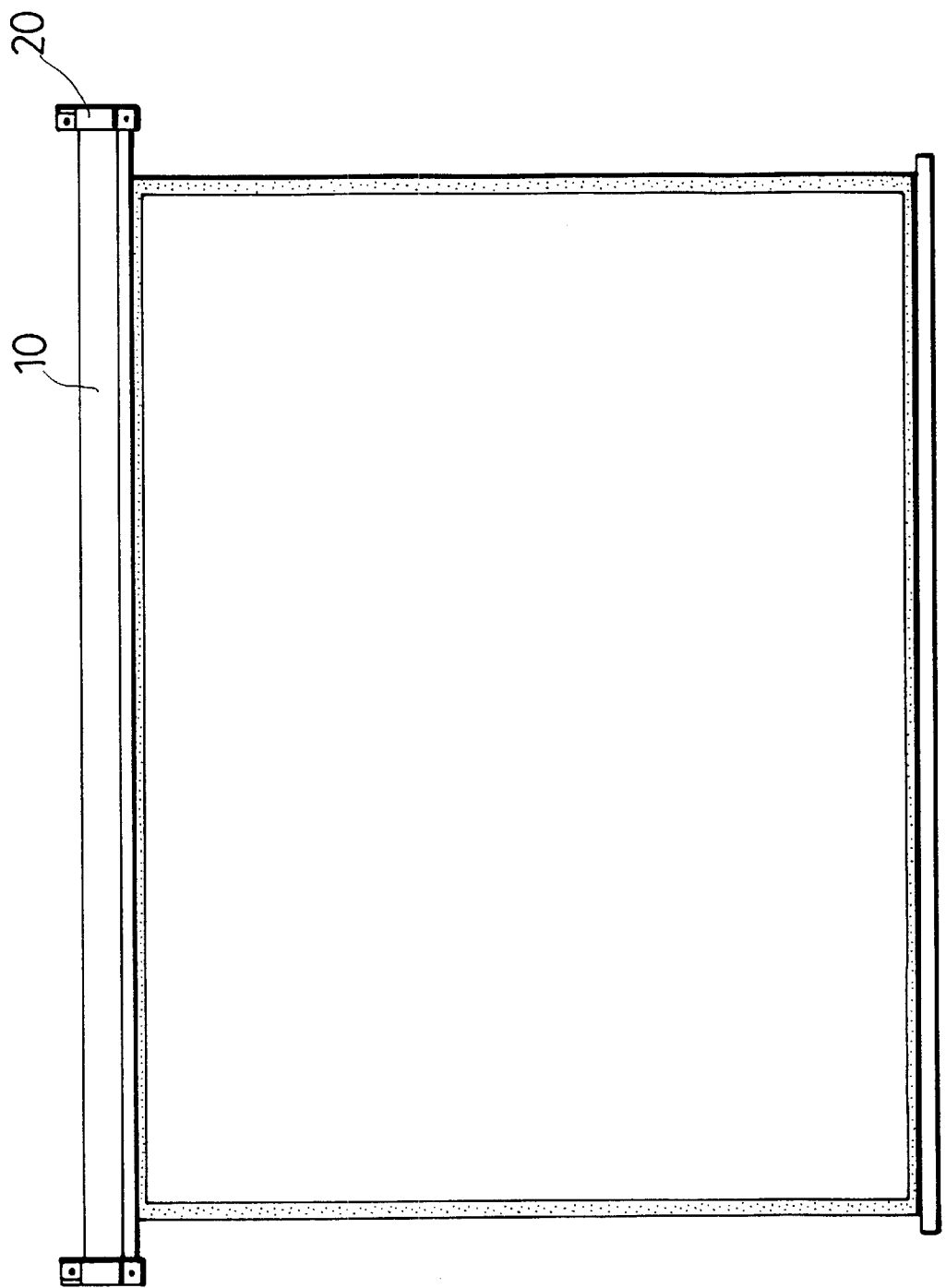
FIG. 2 is a front view of the conventional hanger in an assembled configuration secured to a wall and with the projection screen being pulled down for use.
Figure 3:
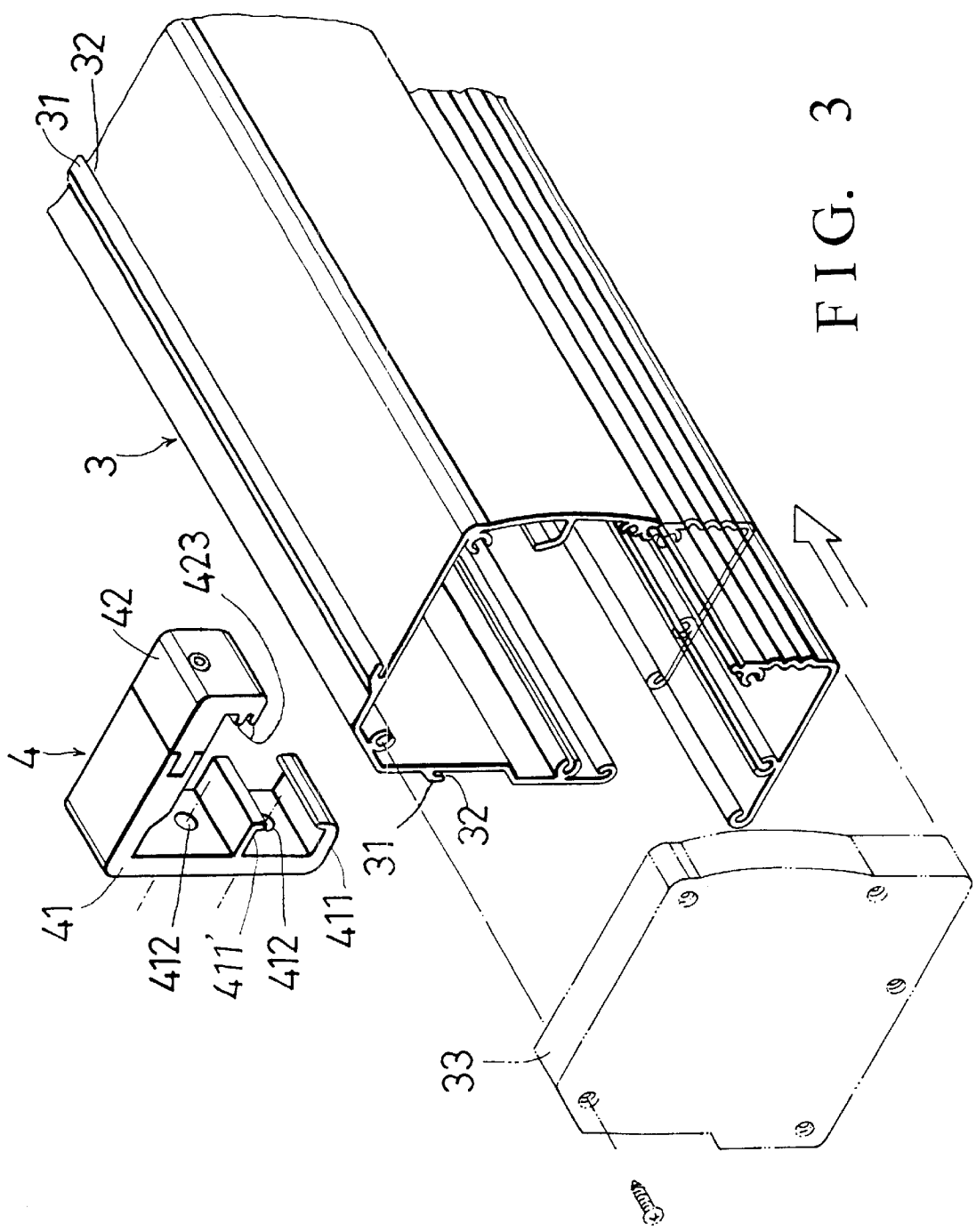
FIG. 3 is a perspective exploded view of an embodiment of the movable projection screen hanger with a steadfast clip in accordance with the present invention.

Referring to FIG. 3, a movable projection screen hanger 3 with a steadfast clip 4 is shown. In use, at least two steadfast clips 4 support the hanger 3.

The hanger 3 is made of an aluminum alloy for securing a projection screen scroll. On the upper surface and the inward facing side surface of he hanger 3 there are respectively provided a sliding rail 31, and a groove 32 formed between each sliding rail 31 and the hanger 3. Two covers 33 are provided respectively to respectively close both end openings of the hanger 3.

Figure 4:
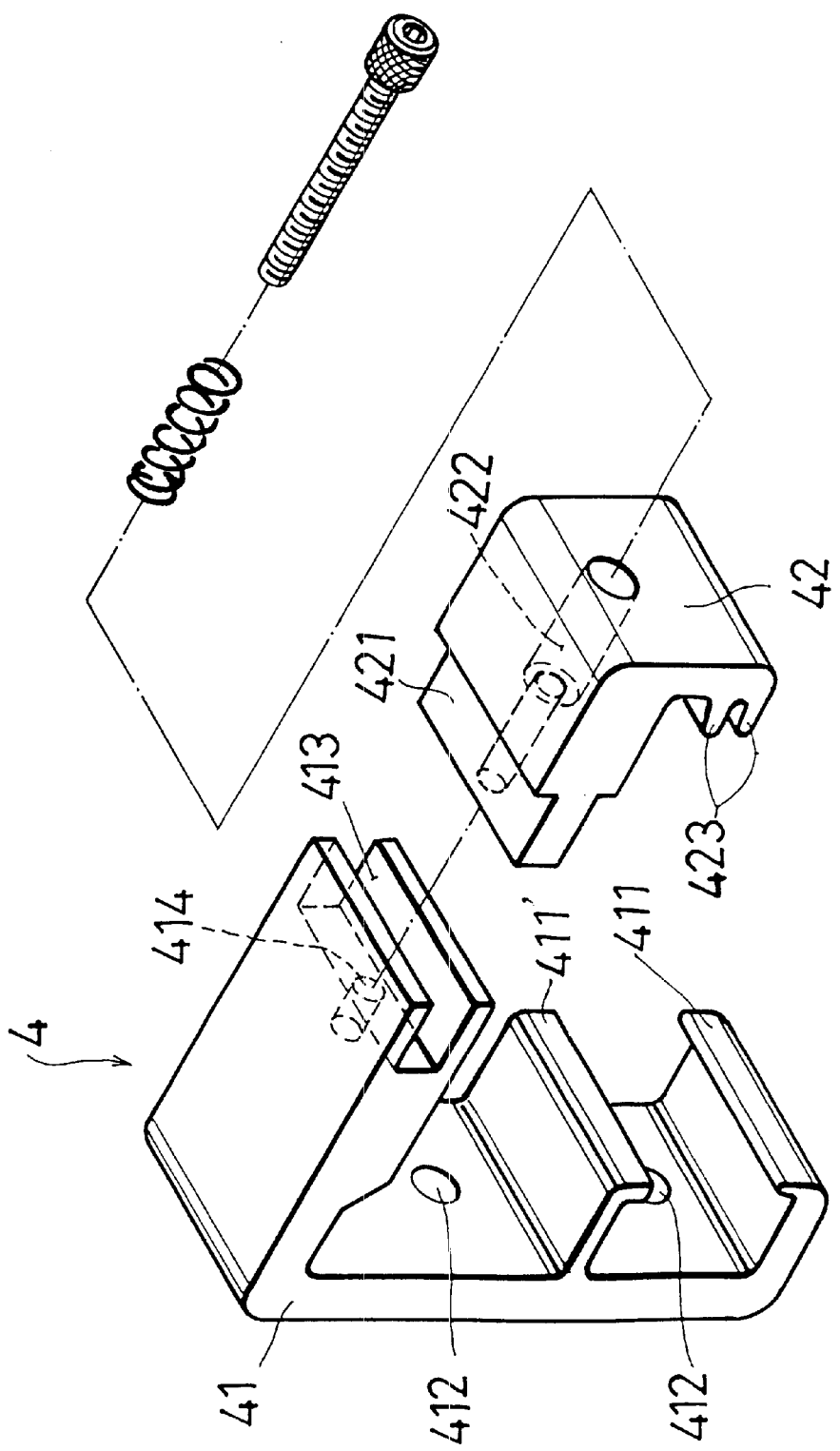
FIG. 4 is a perspective exploded view of a preferred steadfast clip in accordance with an embodiment of the present invention.

Referring to FIG. 4, each steadfast clip 4 is composed of a main body 41 and a pulling button 42. On the bottom end and near the central position of the inner side surface of the main body 41 there is respectively provided a hook block 411 and a reinforcing block 411'. The hook block 411 engages the sliding rail 31 on the inward side surface of the hanger 3 and the stop block 411' acts as a stop against the inward side surface of the hanger 3. Two screwing holes 412 are provided in the side surface of the main body 41. An inserting groove 413 is provided in the frontal upper end of the main body 41, and a threaded opening 414 is provided in the bottom of the inserting groove 413.

On the rear end of the pulling button 42 there is a flange 421, and a long central hole 422 formed therethrough to communicate between the front end and rear end of the pulling button 42. The diameter of the front half of the long central hole 422 is larger than that of the rear half of the long central hole 422. On the bottom end of the pulling button 42 there is provided a pair of catching flanges 423 to engage the sliding rail 31 on the upper surface of the hanger 3. A spring is inserted into the front half of the long central hole 422, a screw is inserted in the spring and passes through the long central hole 422. The rear flange 421 of the pulling button 42 is inserted into the inserting groove 413 of the main body 41, and then the screw in the central hole 422 is screwed into the threaded opening 414 of the main body 41 to assemble the pulling button 42 to the main body 41.

Figure 5:
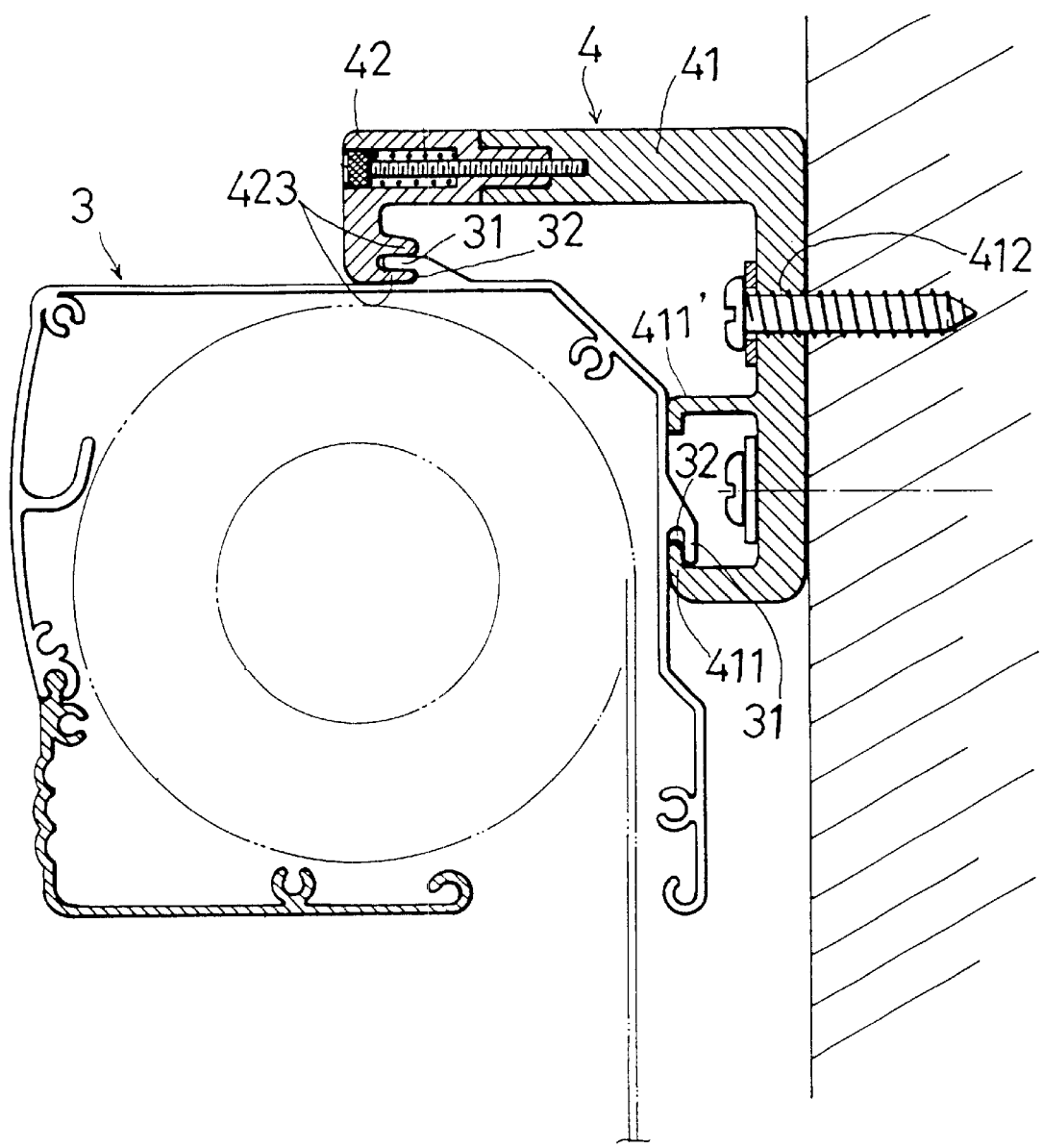
FIG. 5 is a cross-sectional view of the movable projection screen hanger secured to a steadfast clip in an assembled configuration in accordance with the present invention.
Figure 6:
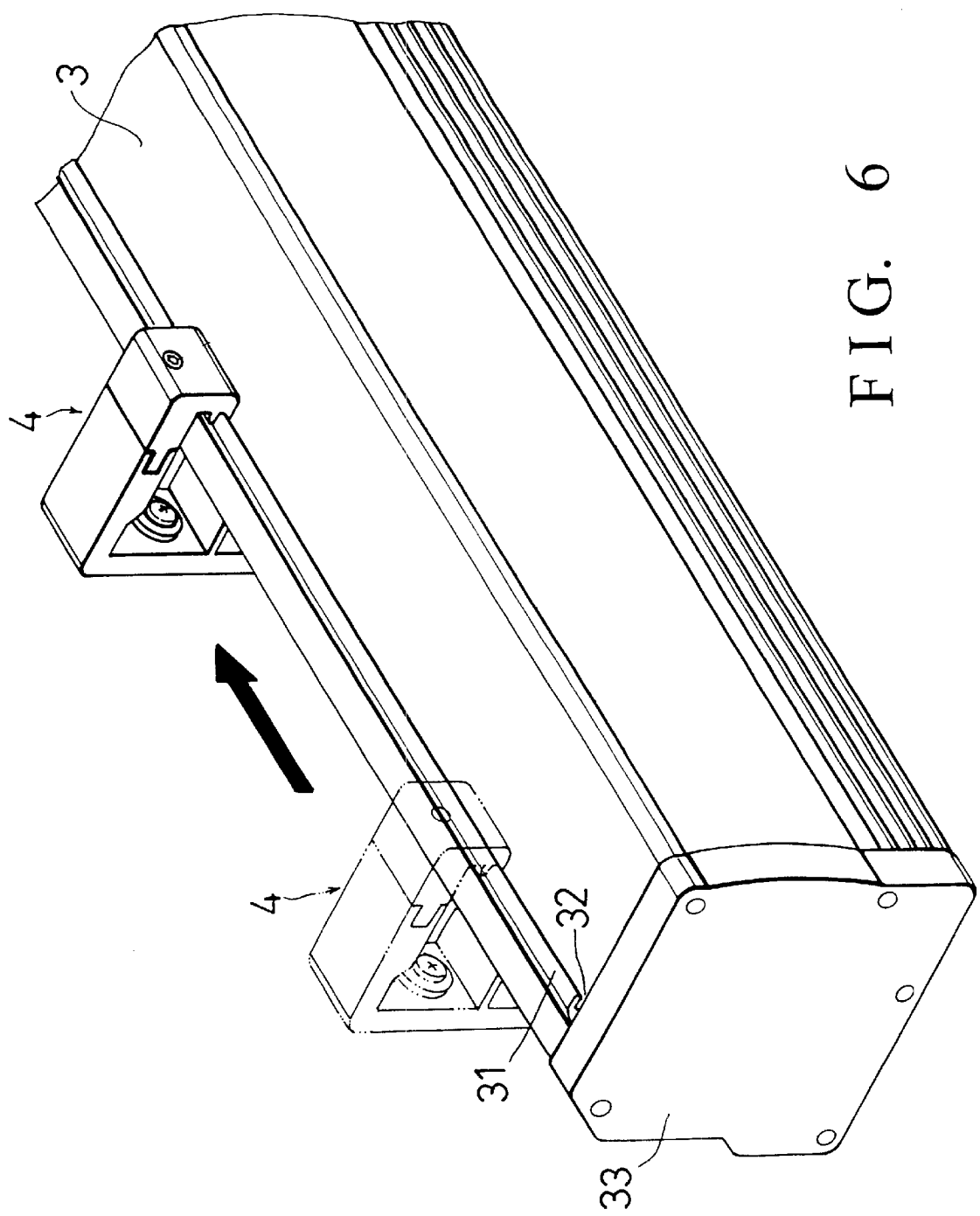
FIG. 6 is a perspective schematic view showing preferred clips being assembled with the hanger and the hanger sliding with respect to the clips in accordance with the present invention; and, FIG. 7 is a sectional schematic view showing the pulling button of a preferred steadfast clip being pulled forward to separate from the hanger in accordance with the present invention.
Figure 7:
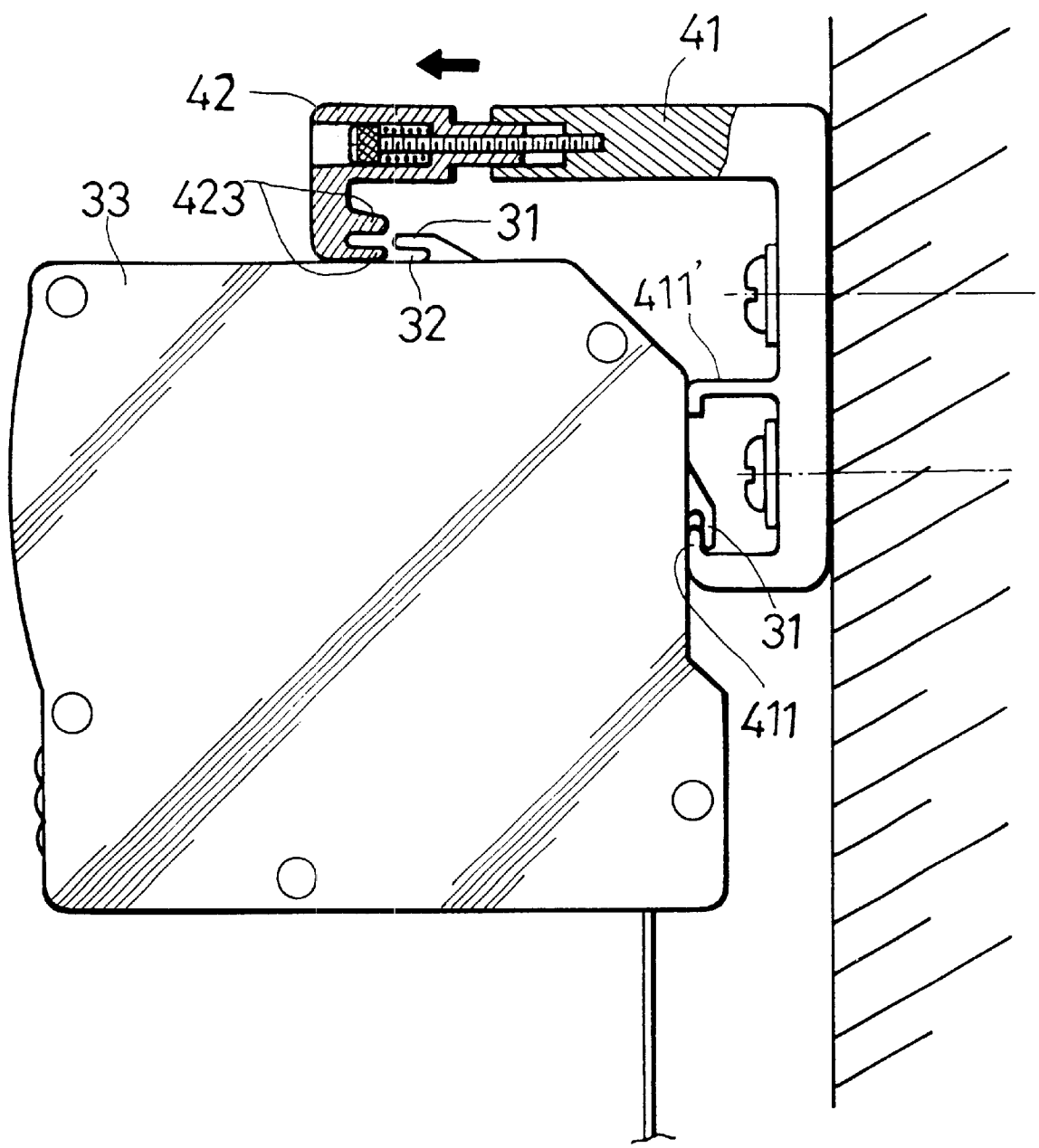

Referring to FIGS. 5 and 6, before the steadfast clips 4 are mounted on a wall, the suitable fixing positions on the wall are first selected according to the length of the hanger 3. Each steadfast clip 4 is secured to the wall by screws being inserted through the screwing holes 412 of the main body 41 of each steadfast clip 4 and screwed into the wall. The sliding rail 31 on the inward side surface of the hanger 3 is engaged with the hook block 411 of each steadfast clip 4, and then the pulling button 42 of each steadfast clip 4 is pulled forward so that each pair of catching flanges 423 engage the sliding rail 31 on the upper surface of the hanger 3 to firmly secure the hanger 3. When being used, the hanger 3 can be moved leftward or rightward to obtain a preferred position. Referring to FIG. 7, each pulling button 42 can be pulled forward again to release each pair of catching flanges 423 from the sliding rail 31 on the upper surface of the hanger 3, so that the hanger 3 can be easily taken off the steadfast clips.

While the preferred embodiments of the invention have been described above, it will be recognized and understood that various modifications may be made thereto and the appended claims are intended to cover all such modifications which may fall within the spirit and scope of the invention.

What is claimed is:

1. A movable projection screen hanger comprising:
   a hanger for securing a projection screen scroll, said hanger having a respective sliding rail formed on an upper surface and a rear side surface thereof, and a groove formed between each sliding rail and a respective surface of said hanger;
   a pair of covers for respective coupling to opposing ends of said hanger to form closures therefore; and,
   at least a pair of steadfast clips for securement to a wall and engagement of said hanger, each steadfast clip including a main body, a pulling button, a spring and a screw, said main body having (a) a hook block formed on a bottom end thereof for engaging said sliding rail on said rear surface of said hanger, (b) a reinforcing block formed adjacent a central portion of a front surface of said main body for contacting said rear surface of said hanger and acting as a stop therefore, (c) a plurality of through holes formed in said main body for respective passage of wall engaging fasteners therethrough, (d) an inserting groove formed in an upper front portion of said main body, and (e) a threaded opening formed in a bottom portion of said inserting groove, said pulling button having a flange formed on a rear side thereof, and an elongated hole extending between a front side and said rear side of said pulling button and passing through said flange, said elongated hole having a frontal portion with a larger diameter than a rear portion thereof, said pulling button having a pair of catching flanges formed on a bottom portion thereof for engaging said sliding rail on said upper surface of said hanger when said flange is engaged in said inserting groove, said spring being disposed in said frontal portion of said elongated hole and said screw passing through said spring and elongated hole for threaded engagement with said threaded opening.

* * * * *